(12) United States Patent
Ma et al.

(10) Patent No.: US 11,770,270 B2
(45) Date of Patent: Sep. 26, 2023

(54) INTEGRATED AUTOMATED DRIVING SYSTEM FOR MARITIME AUTONOMOUS SURFACE SHIP (MASS)

(71) Applicant: Wuhan University of Technology, Hubei (CN)

(72) Inventors: Yong Ma, Hubei (CN); Yujiao Zhao, Hubei (CN)

(73) Assignee: Wuhan University of Technology

( * ) Notice: Subject to any disclaimer, the term of this patent is extended or adjusted under 35 U.S.C. 154(b) by 507 days.

(21) Appl. No.: 17/034,809

(22) Filed: Sep. 28, 2020

(65) Prior Publication Data
US 2021/0116922 A1 Apr. 22, 2021

(30) Foreign Application Priority Data
Oct. 18, 2019 (CN) .......................... 201910994324.4

(51) Int. Cl.
*H04L 12/40* (2006.01)
*B63B 49/00* (2006.01)
(Continued)

(52) U.S. Cl.
CPC ........ *H04L 12/40045* (2013.01); *B63B 49/00* (2013.01); *G05D 1/0206* (2013.01);
(Continued)

(58) Field of Classification Search
CPC .......................... B63B 49/00; B63B 2035/007; G05D 1/0206; G06N 3/08; H04L 12/40; H04L 2012/40286
(Continued)

(56) References Cited

U.S. PATENT DOCUMENTS 9,857,794 B1 * 1/2018 Jarrell .................... B63B 49/00
2012/0277941 A1 * 11/2012 Noffsinger ............... G08G 3/00
701/21

(Continued)

OTHER PUBLICATIONS

Wang et al., "Unmanned Surface Vehicle Course Tracking Control Based on Neural Network and Deep Deterministic Policy Gradient Algorithm", IEEE 978-1-5386-1654-3/18 (Year: 2018).*

*Primary Examiner* — Krishnan Ramesh
(74) *Attorney, Agent, or Firm* — Brian M. Kaufman; Robert D. Atkins; PATENT LAW GROUP: Atkins and Associates, P.C.

(57) ABSTRACT

The present invention discloses an integrated automated driving system for a maritime autonomous surface ship (MASS). The integrated automated driving system for a MASS includes a perception module for perceiving navigational environment of a MASS and obtaining real-time dynamic information of a navigation channel, hydrology, a state of the MASS and traffic environment; a communication system for transmitting data and instructions between the MASS and a shore base as well as between system modules; a data processing module for processing information obtained by the perception module; a decision-making module for identifying a current operating status of the MASS and environment according to data outputted by the data processing module, selecting actions to be taken, and generating operating instructions corresponding to the action; and an execution module for receiving operating instructions sent from the decision-making module and controlling a propeller and a rudder of the MASS through a proportional-integral-derivative (PID) controller.

11 Claims, 5 Drawing Sheets

(51) Int. Cl.
  *G05D 1/02* (2020.01)
  *G06N 3/08* (2023.01)
  *G06F 18/214* (2023.01)
  *B63B 35/00* (2020.01)
(52) U.S. Cl.
  CPC ............. *G06F 18/214* (2023.01); *G06N 3/08* (2013.01); *H04L 12/40* (2013.01); *B63B 2035/007* (2013.01); *H04L 2012/40286* (2013.01)
(58) Field of Classification Search
  USPC .......................................................... 701/21
  See application file for complete search history.

(56) References Cited

U.S. PATENT DOCUMENTS

2017/0349257 A1* 12/2017 Hara ..................... B63H 21/21
2020/0278433 A1*  9/2020 Vanhakartano ......... G01S 15/93
2021/0031885 A1*  2/2021 Suarez Montalvo ... B63B 49/00

* cited by examiner

INTEGRATED AUTOMATED DRIVING SYSTEM FOR MARITIME AUTONOMOUS SURFACE SHIP (MASS)

TECHNICAL FIELD

The present invention relates to the technical field of automated driving, in particular to an integrated automated driving system for a maritime autonomous surface ship (MASS).

BACKGROUND

Under a general trend of intelligence of all things, intelligence of vessels is widely concerned from society, and research on an intelligent MASS was gradually popular at current. With development of science and technology, various high and new technologies such as a sensing technology, a control technology, an information technology and a computer graphics processing technology become more and more mature and provide a technological basis for development of intelligent vessels.

Conforming to a trend of digitalization of a navigational technology, many vessel driving assistive technologies and devices are applied to vessel driving, such as a radar, an electronic navigational chart, an automatic identification systems (AIS) and a sonar. However, a main body for vessel driving is human, additional arrangement of the MASS driving assistive devices undoubtedly increases a workload of a driver, and man-made operational errors are a main cause for vessel navigational accidents. Besides, with development of social and economic level, people's living standards generally improve, and a salary level of vessel staff is correspondingly increased, which undoubtedly and greatly increases cost of navigation. Therefore, development of unmanned surface vessels conforms to trend of the times, and it is necessary to develop an automated driving system for unmanned surface vessels, integrating various sensors, communication devices and data processing devices.

SUMMARY

It is a main objective of the present invention to provide an integrated automated driving system for a MASS to realize unmanned vessel driving.

To achieve the objective, the present invention provides an integrated automated driving system for a MASS. The integrated automated driving system includes:
- a perception module for perceiving navigational environment of a MASS and obtaining real-time dynamic information of a navigation channel, hydrology, a state of the MASS and traffic environment;
- a communication system for transmitting data and instructions between the MASS and a shore base as well as between system modules;
- a data processing module for processing information obtained by the perception module;
- a decision-making module for identifying a current operating status of the MASS and environment according to data outputted by the data processing module, selecting actions to be taken, and generating operating instructions corresponding to the action; and
- an execution module for receiving operating instructions sent from the decision-making module and controlling a propeller and a rudder of the MASS through a PID controller to change a state of motion of the MASS.

Preferably, the perception module includes an external traffic environment perception submodule, an external natural condition perception submodule and a vessel state perception submodule, where
- the external traffic environment perception submodule includes a vision sensor, a radar, a Vessel identification system, an electronic navigational chart and an acoustic sensor;
- the external natural condition perception submodule includes a wave gauge, a visibility acquisition device, a depth sounder, an anemorumbometer, a log and a water flow sensor; and
- the vessel state perception submodule includes a vessel positioning device, a course perception device, a temperature sensor, a humidity sensor and a hull stress monitoring system.

Preferably, the decision-making module fuses data perceived by all the sensors, analyzes current navigational environment of the MASS, makes a decision on the state of motion of the MASS according to the current navigational status of the MASS, and sends operating instructions of the propeller and the rudder to the execution module.

Preferably, the decision-making module inputs the navigational environment information of the MASS and the navigational state of the MASS into a trained deep neural network based on a deep deterministic policy gradient (DDPG) algorithm, and the deep neural network outputs vessel control instructions including vessel thrust information and rudder angle information.

Preferably, a decision-making network in the decision-making module includes a path tracing decision-making network and a collision avoidance decision-making network, priority of a decision made by the collision avoidance decision-making network is higher than that of a decision made by the path tracing decision-making network, and a reward function in the DDPG algorithm includes a path tracing reward function and a collision avoidance reward function.

Preferably, the path tracing reward function is:

$$r_t = exp\left(-k_E\sqrt{(x-x(\theta_t))^2 + (y-y(\theta_t))^2} - k_D\sqrt{\varphi - \varphi(\theta_t))^2}\right) + k_{V1}(\mu - \mu(\theta_t)) + k_{V2}(v - v(\theta_t)) + k_M\frac{\theta}{\Theta};$$

where, $k_E$ is a path deviation coefficient, $k_D$ a course angle deviation coefficient, $k_{V1}$ and $k_{V2}$ are velocity coefficients, $k_M$ is a progress coefficient, which can be adjusted according to a training effect; x and y are respectively a horizontal coordinate and a longitudinal coordinate in vessel coordinates; $\theta_t$ is path tracing completion progress at a time t, $\Theta$ is a total path length, and $$\frac{\theta}{\Theta}$$

is a ratio of a distance between a position of the MASS and a starting point to a distance between the starting point and a finishing point; φ is the course angle of the MASS; $x(\theta_t)$, $y(\theta_t)$ and $\varphi(\theta_t)$ are respectively an expected horizontal coordinate, an expected longitudinal coordinate and the course angle, at the time t; u and v are respectively velocity of the MASS in a direction of surging and velocity of the MASS in a direction of swaying; and $u(\theta_t)$ and $v(\theta_t)$ are respectively an expected value of the velocity of the MASS in the direction of surging and an expected value of the velocity of the MASS in the direction of swaying;

a computation formula of a latest collision avoidance action opportunity $D_{LMA}$ determined by the close quarter situation of the MASS is:

$$D_{LMA} = A_d \times \sqrt{1 + \frac{1}{k^2} - \frac{2\cos\alpha}{k}}$$

where $A_d$ represents a steering advance distance, K represents a velocity ratio, $k=V_T/V_0$, $V_0$ represents current velocity of the MASS, $V_T$ represents velocity of an obstacle, if $V_T$ is 0, $D_{LMA}=A_d$, and $\alpha$ is a relative bearing of the moving obstacle relative to the MASS; the collision avoidance reward function is:

$$r_t = \left(\sum_{t=1}^{n}\ln\left(\frac{DCPA_t}{D_s}\right)^2 + k_{CRI} \times CRI_t\right) +$$

$$exp\left(-\frac{a_1(V)}{D_{LMA}} \times \sum_{t=1}^{4}\sqrt{(\overline{d_1} - \overline{d_{t-1}})^2} - (V_0 - V_S)^2 + a_t(V)\right) +$$

$$1/(1 + exp(-k_{action}\delta_t \times (a_t(C) - a_{t=1}(C))))$$

where, DCPA represents a distance of a closest point of approach between every two collision avoidance substances; $D_s$ represents the closest distance for avoiding collision; $k_{CRI} \in [0,1]$ represents a collision influence coefficient; CRI represents a MASS collision probability; C represents a course angle; $\overline{d_t}$ represents a mean distance of the obstacle at a time t; $\delta$ represents a rudder angle of the MASS; $k_{action} \in [0,1]$ represents an action influence coefficient; $V_0$ and $V_S$ respectively represent current velocity and expected velocity of the MASS; $a_t(C)$ represents course variation in a decision-making set, and $a_t(V)$ represents navigational velocity variation in the decision-making set.

Preferably, the data processing module includes a data processing main module and a data processing submodule, where the data processing submodule corresponds to all the sensors and performs extraction and filtering operations on the data perceived by the sensors; and the data processing main module fuses data outputted from the data processing submodule.

Preferably, the data processing submodule performs formatting operations on the data of the sensors, where the formatting operations include combination of types of the sensors, sensor number, data number, data content, data length and check codes.

Preferably, the communication system includes a communication subsystem between the MASS and the shore base, and a communication subsystem between the system modules, and the system modules include the perception module, the communication module, the data processing module, the decision-making module and the execution module.

Preferably, the communication subsystem between the system modules includes communications between the sensors and the data processing module, as well as communications between functional modules, the sensors are connected with the data processing module through a star network, and the functional modules are in communications through a CAN bus.

The integrated automated driving system for a MASS provided by the present invention integrates functions of environment perception, behavioral decision-making, vessel control, remote control and the like, to realize automated vessel driving, greatly reduce manpower and guarantee safe navigation of the MASS.

Implementation of objectives, functional characteristics, and advantages of the present invention will be further described with reference to the accompanying drawings.

DETAILED DESCRIPTION

It should be understood that examples described herein are merely intended to explain the present invention, rather than to limit the present invention.

In the description of the present invention, it should be illustrated that orientation or position relationships indicated by terms "transverse", "longitudinal", "upper", "lower", "front", "rear", "left", "right", "vertical", "horizontal", "top", "bottom", "inside", "outside", and the like. are orientation or position relationships as shown in the drawings, and these terms are just used to facilitate description of the present invention and simplify the description, but not to indicate or imply that the mentioned devices or elements must have a specific orientation and must be established and operated in a specific orientation, and thus, these terms cannot be understood as a limitation to the present invention. Moreover, terms such as "first" and "second" are used only for the objective of description and are not intended to indicate or imply relative importance.

Figure 1:
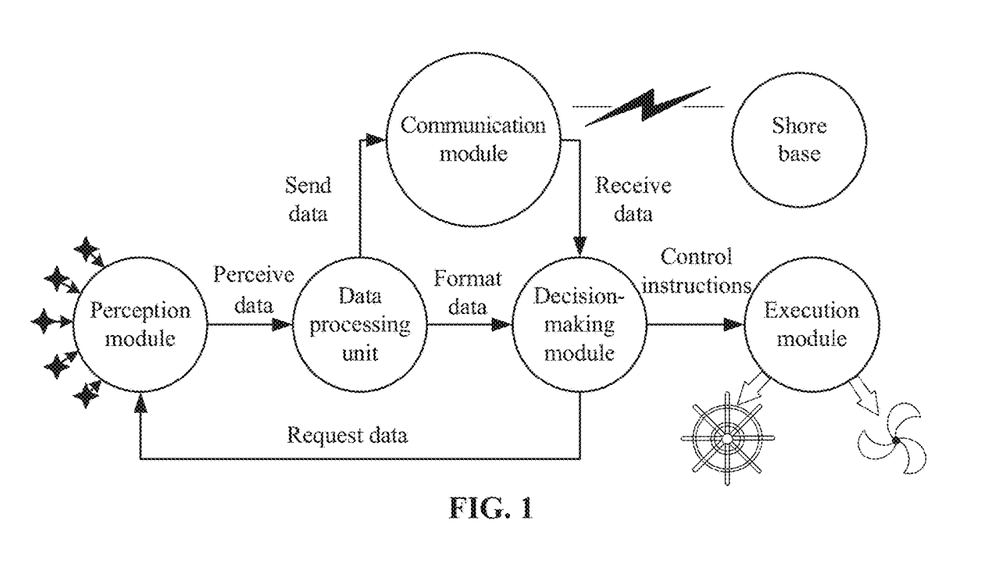
FIG. 1 shows a structural block diagram of an integrated automated driving system for a MASS disclosed by the present invention.

Referring to FIG. 1 to FIG. 5, an integrated automated driving system for a MASS in the preferable example includes:

a perception module for perceiving navigational environment of a MASS and obtaining real-time dynamic information of a navigation channel, hydrology, a state of the MASS and traffic environment;

a communication system for transmitting data and instructions between the MASS and a shore base as well as between system modules;

a data processing module for processing information obtained by the perception module;

a decision-making module for identifying a current operating status of the MASS and environment according to data outputted by the data processing module, selecting actions to be taken, and generating operating instructions corresponding to the action; and an execution module for receiving operating instructions sent from the decision-making module and controlling a propeller and a rudder of the MASS through a PID controller to change a state of motion of the MASS.

Specifically, the perception module includes an external traffic environment perception submodule, an external natural condition perception submodule and a vessel state perception submodule, where the external traffic environment perception submodule includes a vision sensor, a radar, a Vessel identification system, an electronic navigational chart and an acoustic sensor;

the external natural condition perception submodule includes a wave gauge, a visibility acquisition device, a depth sounder, an anemorumbometer, a log and a water flow sensor; and the vessel state perception submodule includes a vessel positioning device, a course perception device, a temperature sensor, a humidity sensor and a hull stress monitoring system.

Figure 4:
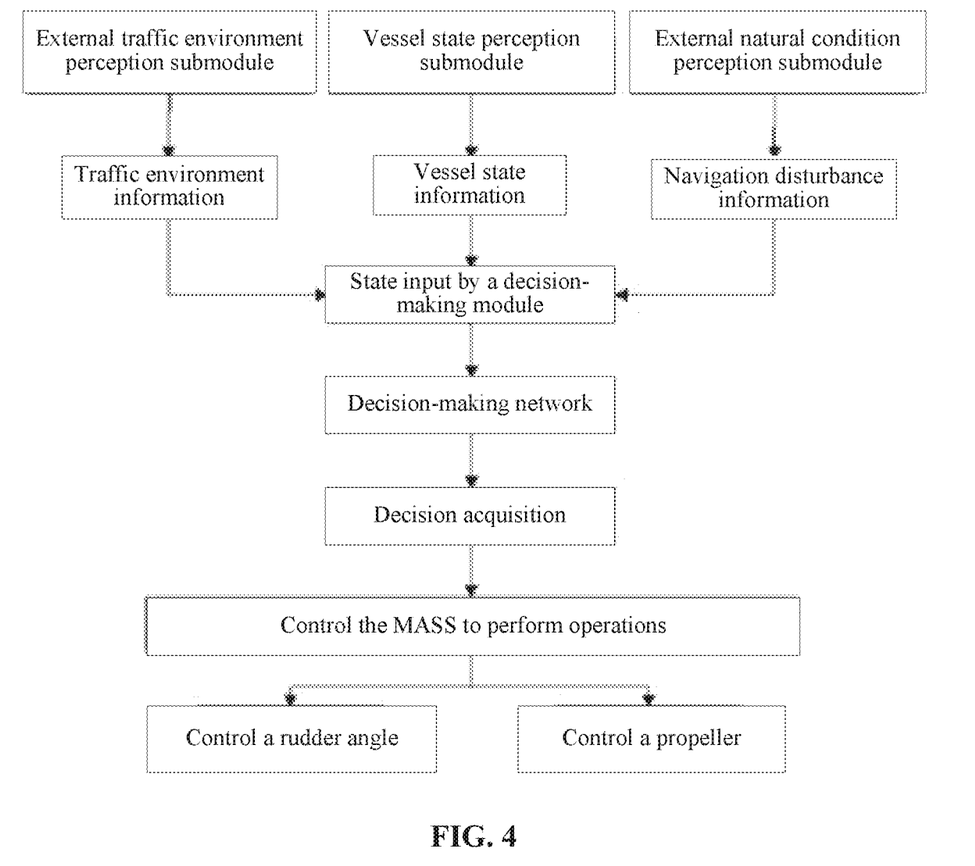
FIG. 4 shows a schematic diagram of a decision-making process of a decision-making module in the integrated automated driving system for a MASS disclosed by the present invention.

Specifically, the decision-making module fuses data perceived by all the sensors, analyzes current navigational environment of the MASS, makes a decision on the state of motion of the MASS according to the current navigational status of the MASS, and sends operating instructions of the propeller and the rudder to the execution module.

The decision-making module inputs the navigational environment information of the MASS and the navigational state of the MASS into a trained deep neural network based on a deep deterministic policy gradient (DDPG) algorithm, and the deep neural network outputs vessel control instructions including vessel thrust information and rudder angle information.

A decision-making network in the decision-making module includes a path tracing decision-making network and a collision avoidance decision-making network, priority of a decision made by the collision avoidance decision-making network is higher than that of a decision made by the path tracing decision-making network, and a reward function in the DDPG algorithm includes a path tracing reward function and a collision avoidance reward function.

Figure 6:
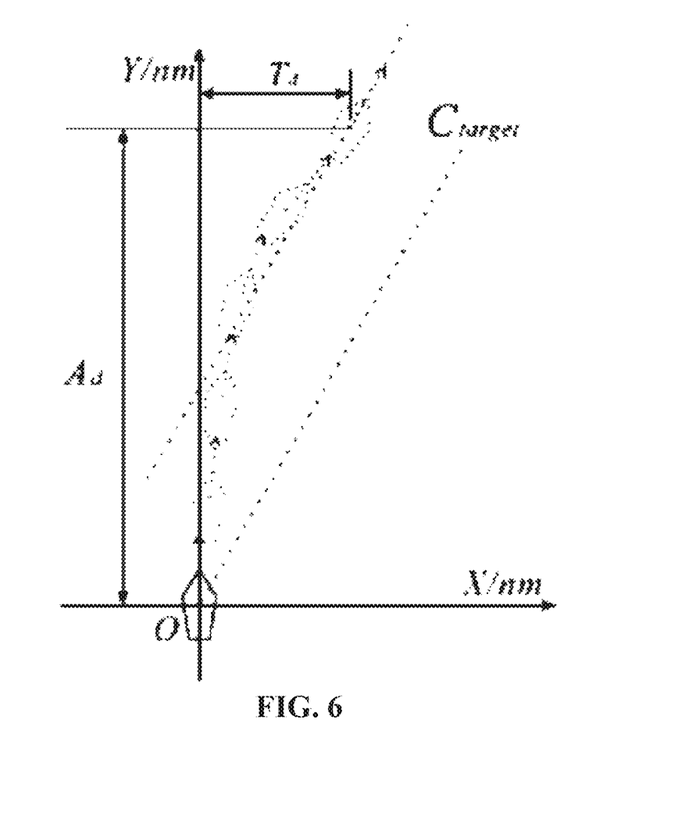
FIG. 6 shows a schematic diagram of a steering advance distance.

Specifically, the path tracing reward function is:

$$r_t = cxp\left(-k_E\sqrt{(x-x(\theta_t))^2 + (y-y(\theta_t))^2} - k_D\sqrt{\varphi-\varphi(\theta_t))^2}\right) +$$
$$k_{V1}(\mu-\mu(\theta_t)) + k_{V2}(v-v(\theta_t)) + k_M\frac{\theta}{\Theta};$$

where, $k_E$ is a path deviation coefficient, $k_D$ is a course angle deviation coefficient, $k^{V1}$ and $k_{V2}$ are velocity coefficients, $k_M$ is a progress coefficient, which can be adjusted according to a training effect; x and y are respectively a horizontal coordinate and a longitudinal coordinate in vessel coordinates; $\theta_t$ is path tracing completion progress at a time t, $\Theta$ is a total path length, and $$\frac{\theta}{\Theta}$$

is a ratio of a distance between a position of the MASS and a starting point to a distance between the starting point and a finishing point; φ is the course angle of the MASS; $x(\theta_t)$ $y(\theta_t)$ and $\varphi(\theta_t)$ are respectively an expected horizontal coordinate, an expected longitudinal coordinate and the course angle, at the time t; u and v are respectively velocity of the MASS in a direction of surging and velocity of the MASS in a direction of swaying; and $\mu(\theta_t)$ and $v(\theta^t)$ are respectively an expected value of the velocity of the MASS in the direction of surging and an expected value of the velocity of the MASS in the direction of swaying;

Referring to FIG. 6, a computation formula of a latest collision avoidance action opportunity $D_{LMA}$ determined by the close quarter situation of the MASS is:

$$D_{LMA} = A_d \times \sqrt{1 + \frac{1}{k^2} - \frac{2\cos\alpha}{k}};$$

where, $A_d$ represents a steering advance distance, K represents a velocity ratio, $k=V_T/V_0$, $V_0$ represents current velocity of the MASS, $V_T$ represents T represents velocity of an obstacle, if $V_T$ is 0, $D_{LMA}=A_d$, and α is a relative bearing of the moving obstacle relative to the MASS;

the collision avoidance reward function is:

$$r_t = \left(\sum_{t=1}^n \ln\left(\frac{DCPA_t}{D_s}\right)^2 + k_{CRI} \times CRI_t\right) +$$
$$cxp\left(-\frac{a_1(V)}{D_{LMA}} \times \sum_{t=1}^4 \sqrt{(\overline{d_t} - \overline{d_{t-1}})^2} - (V_0 - V_S)^2 + a_t(V)\right) +$$
$$1/(1 + cxp(-k_{action}\delta_t \times (a_t(C) - a_{t-1}(C))));$$

where, DCPA represents a distance of a closest point of approach between every two collision avoidance substances; $D_s$ represents the closest distance for avoiding collision; $k_{CRI} \in [0,1]$ represents a collision influence coefficient; CRI represents a MASS collision probability; C represents a course angle; $\overline{d}_t$ represents a mean distance of the obstacle at a time t; δ represents a rudder angle of the MASS; $k_{action} \in [0,1]$ represents an action influence coefficient; $V_0$ and $V_S$ respectively represent current velocity and expected velocity of the MASS; $a_t(C)$ represents course variation in a decision-making set, and $a_t(V)$ represents navigational velocity variation in the decision-making set.

The latest collision avoidance action opportunity $D_{LMA}$ determined by the close quarter situation of the MASS is a node, if a collision avoidance action is not made yet after the node, the MASS does not have enough time and space to avoid collision, and then collision occurs. The collision avoidance reward function is designed through the opportunity.

Figure 5:
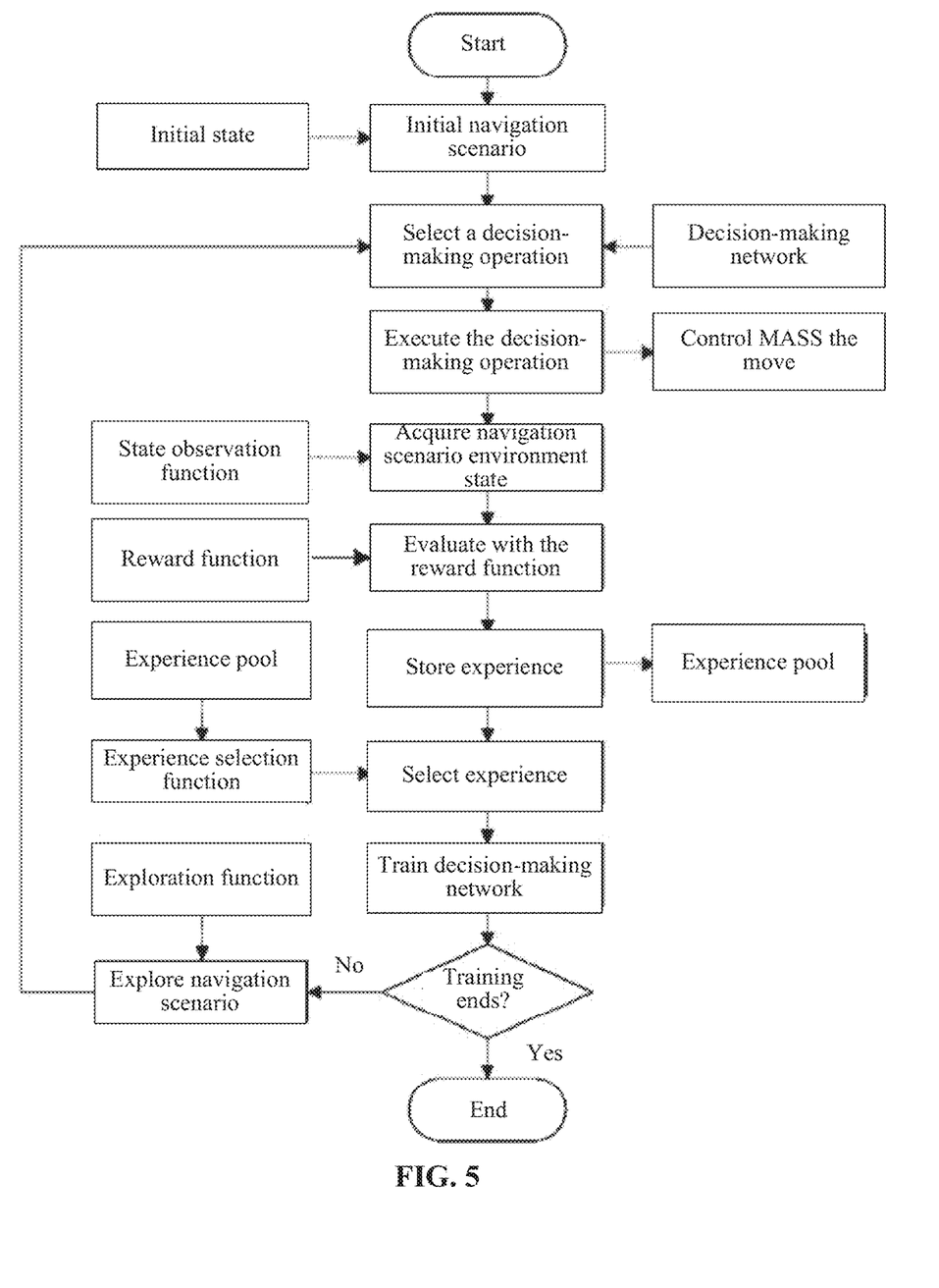
FIG. 5 shows a flowchart of training of a decision-making network in the integrated automated driving system for a MASS disclosed by the present invention.

The reward function is designed to train a decision-making network, and the trained decision-making network can automatically output vessel control instructions according to the state of motion of the MASS and environment state.

Figure 3:
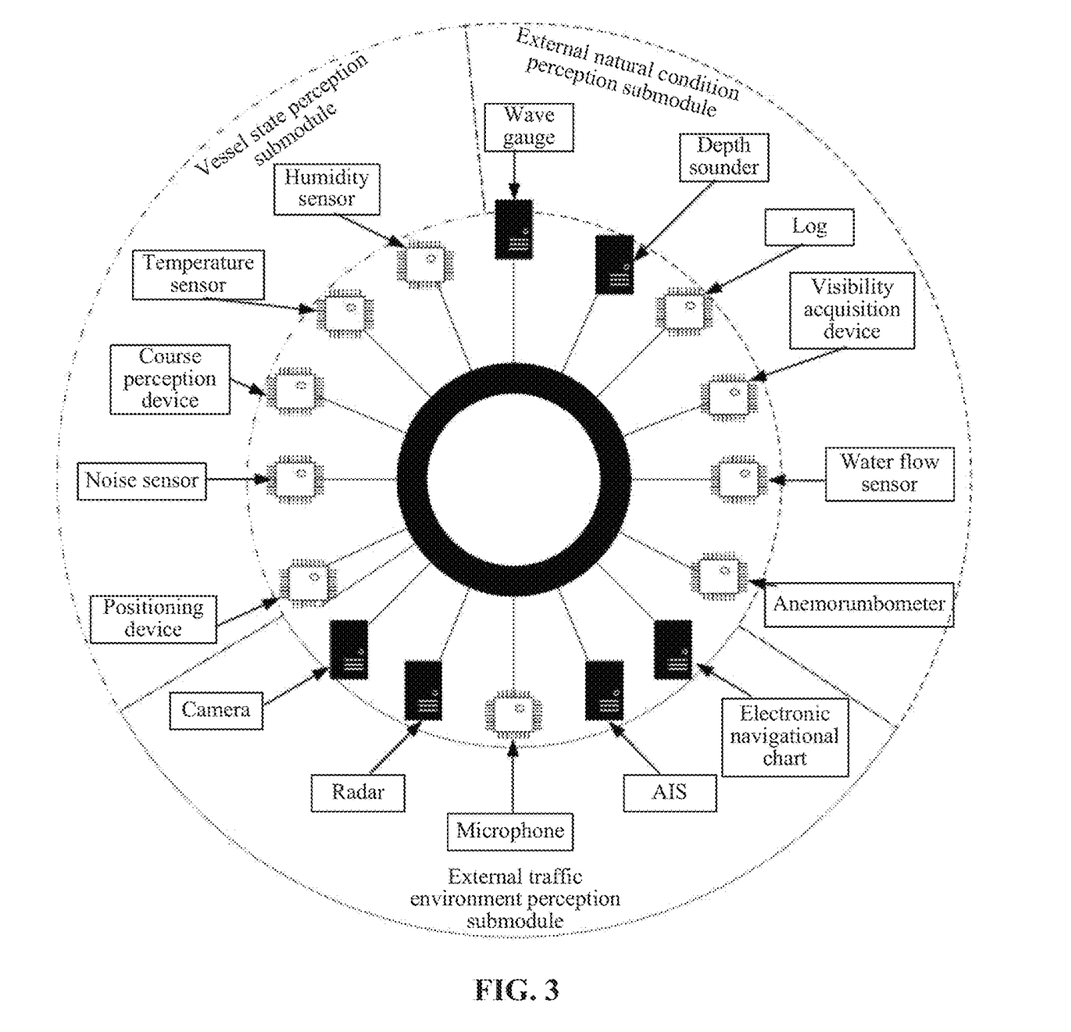
FIG. 3 shows a schematic diagram of network connection between a perception module and a data processing module in the integrated automated driving system for a MASS disclosed by the present invention.

The path decision-making network and the collision avoidance decision-making network are both deep neural networks, are the same in network structure, and both consists of 4 fully connected layers, 13, 400, 300 and 2 nodes are respectively set for four layers, input information is the state of each sensor, and output information is the thrust and the rudder angle of the MASS. The deep neural network adopts a general procedure, for different tasks, corresponding reward functions and state observation functions are designed, the corresponding decision-making networks are also designed, i.e., the path tracing decision-making network and the collision avoidance decision-making network respectively correspond to the path tracing reward function and the collision avoidance reward function, need to be respectively trained, and are independent in contents without intersections, but when the MASS executes the actions generated by the two networks, priority of the actions needs to be determined. The state observation function corresponds to information obtained by the sensors in the vessel state perception submodule and the external natural condition perception submodule as shown in FIG. 3, the information is subjected to normalization operations firstly, and then is combined to form a one-dimensional vector as the input of the decision-making network. The reward function in FIG. 5 corresponds to the path tracing reward function in the training process of the path tracing decision-making network, and corresponds to the collision avoidance reward function in the training process of the collision avoidance decision-making network.

An experience pool stores experience data under an exploration state, training data of the network is extracted from the experience pool, and each experience consists of four parts (state observed by the state observation function, action instructions outputted by the decision-making network, reward values computed by the reward function, and state observed by the state observation function after the action instructions are executed).

In addition, the perception module has the problem: in the actual navigation process of the MASS, the perception module needs to acquire comprehensive environment data to be supplied for the decision-making module for decision-making. The environment data is quite large in data volume and has massive redundancy and invalid data so that the data processing module has extremely large requirements for computation resources and is high in computation time consumption, thereby influencing decision-making efficiency.

Therefore, an efficient perception control method is designed based on the deep deterministic policy gradient (DDPG) algorithm, to improve utilization efficiency of the data perceived by the perception module, reduce exploration frequency of the perception device and reduce generation of junk data.

The principle is: the perception device in the perception module has a certain perception range, but perception accuracy is often reduced along with increase of the perception distance. Respective perception ranges are set for each of the perception devices, and a perception region is defined as a region in the perception range, obtained by the perception devices at a certain time; and each perception device can only perform a perception action once in each respective perception region. Thus, perception frequency of each perception device is remarkably reduced, and utilization efficiency of perceived data is improved.

But during navigation of the MASS, the navigational environment is dynamic environment and has uncertainty, and the perception frequency can be reduced under a situation of guaranteeing safe navigation of the MASS through adjusting the perception range of each perception device. A large perception region can be designed when the environment is stable, and a small perception region can be designed when environment factor variation is frequent. The present invention designs a self-adaptive adjustment algorithm of the perception region of the perception device based on the deep deterministic policy gradient algorithm, speculates environment dynamic variation degree according to historical environment characteristic sequences, and adjusts the perception region for different perception devices.

The self-adaptive adjustment algorithm of the perception region of the perception device is based on the deep deterministic policy gradient (DDPG) algorithm, input information of the algorithm is the historical environment characteristic sequences, and output information is the perception range of the perception device. To train a self-adaptive adjustment model of the perception region, the reward function is designed according to task requirements:

$$r_t = k.n.\left(\sum_{t=1}^{n}(X_{ot} - X_{\Delta t}) + n\right);$$

where, $r_t$ is a reward value of the $t_{th}$ perception region, $k \in (0,1)$ is a reward coefficient, n is the number of the perception regions, $X_{ot}$ is information characteristics in the $t_{th}$ perception region, and $X_{\Delta t}$ is real-time information characteristics when the unmanned surface vessel navigates in the perception regions.

Specifically, the data processing module includes a data processing main module and a data processing submodule, where the data processing submodule corresponds to all the sensors and performs extraction and filtering operations on the data perceived by the sensors; and the data processing main module fuses data outputted from the data processing submodule.

The data processing submodule performs formatting operations on the data of the sensors, where the formatting operations include combination of types of the sensors, sensor number, data number, data content, data length and check codes.

Figure 2:
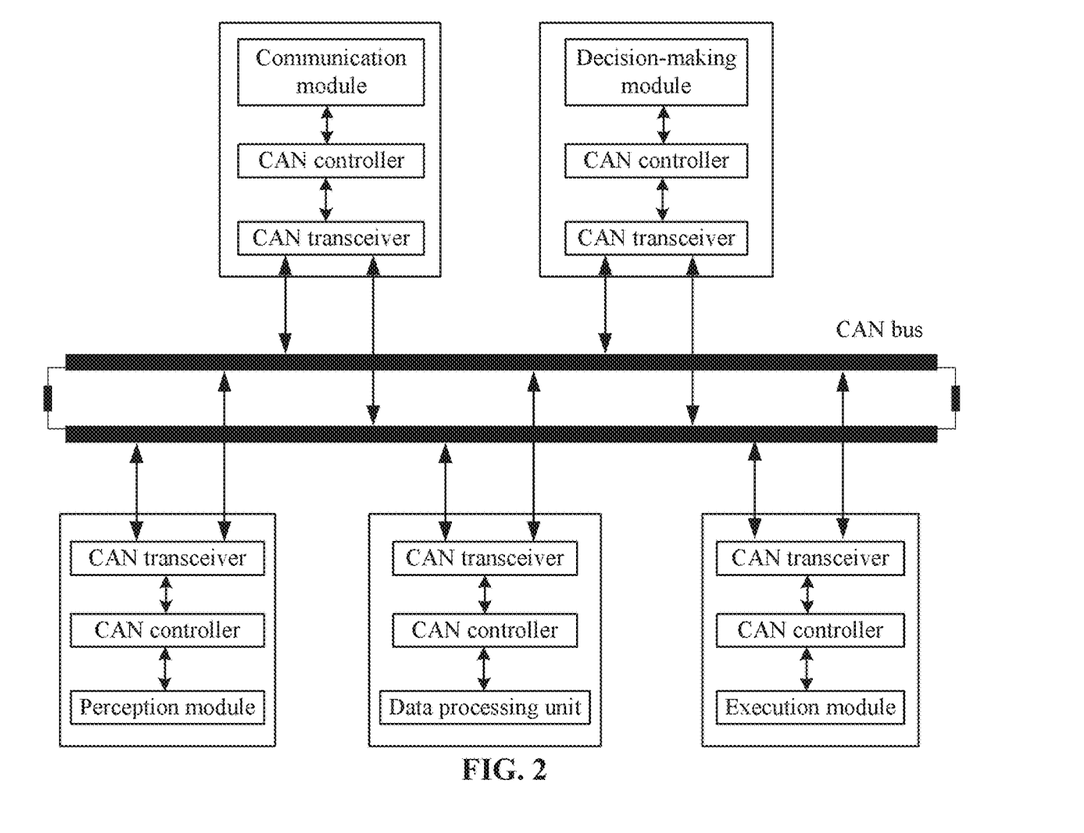
FIG. 2 shows a schematic diagram of a communication mode between modules of the integrated automated driving system for a MASS disclosed by the present invention.

The communication system includes a communication subsystem between the MASS and the shore base, and a communication subsystem between the system modules, and the system modules include the perception module, the communication module, the data processing module, the decision-making module and the execution module. The communication subsystem between the MASS and the shore base has the characteristics of long-distance high-quality wireless communications, and the communication subsystem between the system modules has the characteristics of being stable, low in time delay and high in band width.

The communication subsystem between the system modules includes communications between the sensors and the data processing module, as well as communications between functional modules, the sensors are connected with the data processing module through a star network, and the functional modules are in communications through a CAN bus.

A data transmitting process between the modules in the integrated system is: the data transmitting module sends data to be sent to the CAN controller, the CAN controller sends the data to a CAN transceiver, and then the CAN transceiver converts the data into electric signals and sends the electrical signals to an objective module.

The data processing submodule in the data processing module respectively selects 4 STM32 chips and 3 Cortex processors according to a complexity degree of the processed data. For example, for the sensor in the vessel state perception submodule, one STM32 chip processes the data of the vessel positioning device, the temperature sensor, the humidity sensor and a noise sensor, and another STM32 chip processes the data of a vibration sensor, the course perception device and the hull stress monitoring system; for the devices in the external natural condition perception submodule, one STM32 chip processes the data of the wave gauge, the depth sounder and the water flow sensor, and another STM32 chip processes the data of the anemorumbometer, the log and the visibility acquisition device; and for the devices in the external traffic environment perception submodule, one Cortex processor processes the data of the vision sensor and the acoustic sensor, another Cortex processor processes the data of the radar and AIS, and another Cortex processor analyzes the electronic navigational chart. The data processing main module selects 3 Cortex processors to fuse data of different types of sensors, adopts one Cortex processor to fuse the data based on positioning, such as vessel positioning data, course data, depth sounding data, log data and visibility, adopts one Cortex processor to fuse data relating to safety of the MASS, such as temperature, humidity, noise, vibration and hull stress, and adopts one Cortex processor to fuse vessel navigation environment data such as image data, radar scanning and detecting data, AIS data, water flow data and wave data.

The integrated automated driving system for a MASS provided by the present invention integrates functions of environment perception, behavioral decision-making, vessel control, remote control and the like, to realize automated vessel driving, greatly reduce manpower and guarantee safe navigation of the MASS.

The foregoing is merely a preferable example of the present invention without limitation on the scope of the present invention. Any equivalent structure change made by using the description and the accompanying drawings of the present invention, or direct or indirect application thereof in other related technical fields, shall still fall in the protection scope of the patent of the present invention.

What is claimed is:

1. An integrated automated driving system for a maritime autonomous surface ship (MASS), comprising:

a perception device configured to perceive a navigational environment of the MASS and obtain real-time dynamic information of a navigation channel, hydrology, a state or a traffic environment of the MASS;

a communication device coupled to the perception device;

a processor configured to:

process information obtained by the perception device;

identify a current operating status of the MASS and environment according to the processed information select actions to be taken, generate operating instructions corresponding to the action based on a deep deterministic policy gradient (DDPG) algorithm, wherein a reward function in the DDPG algorithm comprises a path tracing reward function and a collision avoidance reward function, and control a propeller and a rudder of the MASS through a proportional-integral-derivative (PID) controller based on the operating instructions to change a state of motion of the MASS;

wherein the path tracing reward function is:

$$r_t = exp\left(-k_E\sqrt{(x-x(\theta_t))^2 + (y-y(\theta_t))^2} - k_D\sqrt{\varphi - \varphi(\theta_t))^2}\right) + k_{V1}(\mu - \mu(\theta_t)) + k_{V2}(v - v(\theta_t)) + k_M\frac{\theta}{\Theta};$$

wherein, $k_E$ is a path deviation coefficient, $k_D$ is a course angle deviation coefficient, $k_{V1}$ and $k_{V2}$ are velocity coefficients, $k_M$ is a progress coefficient, which can be adjusted according to a training effect; x and y are respectively a horizontal coordinate and a longitudinal coordinate in vessel coordinates; $\theta_t$ is path tracing completion progress at a time t, $\Theta$ is a total path length, and $$\frac{\theta}{\Theta}$$

is a ratio of a distance between a position of the MASS and a starting point to a distance between the starting point and a finishing point; $\varphi$ is the course angle of the MASS; $x(\theta_t)$ $y(\theta_t)$ and $\varphi(\theta_t)$ are respectively an expected horizontal coordinate, an expected longitudinal coordinate and the course angle, at the time t; u and v are respectively velocity of the MASS in a direction of surging and velocity of the MASS in a direction of swaying; and $u(\theta_t)$ and $v(\theta_t)$ are respectively an expected value of the velocity of the MASS in the direction of surging and an expected value of the velocity of the MASS in the direction of swaying;

a computation formula of a latest collision avoidance action opportunity $D_{LMA}$ determined by the close quarter situation of the MASS is:

$$D_{LMA} = A_d \times \sqrt{1 + \frac{1}{k^2} - \frac{2\cos\alpha}{k}}$$

wherein $A_d$ represents a steering advance distance, K represents a velocity ratio, $k=V_T/V_0$, $V_0$ represents current velocity of the MASS, $V_T$ represents velocity of an obstacle, if $V_T$ is 0, $D_{LMA}=A_d$, and $\alpha$ is a relative bearing of the moving obstacle relative to the MASS; the collision avoidance reward function is:

$$r_t = \left(\sum_{t=1}^{n}\ln\left(\frac{DCPA_t}{D_s}\right)^2 + k_{CRI} \times CRI_t\right) +$$

$$exp\left(-\frac{a_1(V)}{D_{LMA}} \times \sum_{t=1}^{4}\sqrt{(\overline{d_1} - \overline{d_{t-1}})^2} - (V_0 - V_S)^2 + a_t(V)\right) +$$

$$1/(1 + exp(-k_{action}\delta_t \times (a_t(C) - a_{t=1}(C))))$$

wherein, DCPA represents a distance of a closest point of approach between every two collision avoidance substances; $D_s$ represents the closest distance for avoiding collision; $k_{CRI} \in [0,1]$ represents a collision influence coefficient; CRI represents a MASS collision probability; C represents a course angle; $d_t$ represents a mean distance of the obstacle at a time t; $\delta$ represents a rudder angle of the MASS; $k_{action} \in [0,1]$ represents an action influence coefficient; $V_0$ and $V_S$ respectively represent current velocity and expected velocity of the MASS; $a_r$ (C) represents course variation in a decision-making set, and $a_t$ (V) represents navigational velocity variation in the decision-making set.

2. The integrated automated driving system for a MASS according to claim 1, wherein:
the perception device comprises an external traffic environment perception device, an external natural condition perception device and a vessel state perception device;
the external traffic environment perception device comprises a vision sensor, a radar, a Vessel identification system, an electronic navigational chart and an acoustic sensor;
the external natural condition perception device comprises a wave gauge, a visibility acquisition device, a depth sounder, an anemorumbometer, a log and a water flow sensor; and
the vessel state perception device comprises a vessel positioning device, a course perception device, a temperature sensor, a humidity sensor and a hull stress monitoring system.

3. The integrated automated driving system for a MASS according to claim 2, wherein the processor fuses data perceived by all the sensors, analyzes current navigational environment of the MASS, makes a decision on the state of motion of the MASS according to the current navigational status of the MASS, and sends the operating instructions of the propeller and the rudder.

4. The integrated automated driving system for a MASS according to claim 3, wherein the processor inputs the navigational environment information of the MASS and the navigational state of the MASS into a trained deep neural network, and the deep neural network outputs vessel control instructions comprising vessel thrust information and rudder angle information.

5. The integrated automated driving system for a MASS according to claim 4, wherein a decision-making network in the processor comprises a path tracing decision-making network and a collision avoidance decision-making network, priority of a decision made by the collision avoidance decision-making network is higher than that of a decision made by the path tracing decision-making network.

6. The integrated automated driving system for a MASS according to claim 5, wherein the sensors are connected with the processor through a star network, and the perception device, communication device, and processor are in communications through a CAN bus.

7. The integrated automated driving system for a MASS according to claim 4, wherein the sensors are connected with the processor through a star network, and the perception device, communication device, and processor are in communications through a CAN bus.

8. The integrated automated driving system for a MASS according to claim 3, wherein the sensors are connected with the processor through a star network, and the perception device, communication device, and processor are in communications through a CAN bus.

9. The integrated automated driving system for a MASS according to claim 2, wherein the processor performs extraction and filtering operations on the data perceived by the sensors and fuses the filtered data.

10. The integrated automated driving system for a MASS according to claim 7, wherein the processor performs formatting operations on the data of the sensors; and the formatting operations comprise combination of types of the sensors, sensor number, data number, data content, data length and check codes.

11. The integrated automated driving system for a MASS according to claim 2, wherein the sensors are connected with the processor through a star network, and the perception device, communication device, and processor are in communications through a CAN bus.

* * * * *